(12) United States Patent
Matsubara et al.

(10) Patent No.: US 10,099,557 B2
(45) Date of Patent: Oct. 16, 2018

(54) VEHICLE DRIVEN BY MOTOR AND CONTROL METHOD OF CHARGING AND DISCHARGING OF SECONDARY BATTERY PROVIDED IN VEHICLE

(71) Applicant: TOYOTA JIDOSHA KABUSHIKI KAISHA, Toyota-shi, Aichi-ken (JP)

(72) Inventors: Yasuo Matsubara, Anjo (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/925,004

(22) Filed: Oct. 28, 2015

(65) Prior Publication Data

US 2016/0129804 A1 May 12, 2016

(30) Foreign Application Priority Data

Nov. 6, 2014 (JP) .................. 2014-225678

(51) Int. Cl.
*B60L 11/18* (2006.01)
*B60L 1/00* (2006.01)

(52) U.S. Cl.
CPC .............. *B60L 1/00* (2013.01); *B60L 11/1862* (2013.01); *B60L 11/1887* (2013.01); *B60L 2240/12* (2013.01); *B60L 2240/54* (2013.01); *Y02T 10/705* (2013.01); *Y02T 10/7044* (2013.01); *Y02T 10/7258* (2013.01); *Y02T 10/92* (2013.01); *Y02T 90/34* (2013.01)

(58) Field of Classification Search
CPC .... B60L 11/18; B60L 11/1809; B60L 11/1861

USPC .......................................... 318/139
See application file for complete search history.

(56) References Cited

U.S. PATENT DOCUMENTS

| | | | | |
|---|---|---|---|---|
| 9,211,804 B2* | 12/2015 | Preece | .................. | H01M 10/44 |
| 9,266,529 B2* | 2/2016 | Dufford | ................. | B60W 20/40 |
| 9,758,153 B2* | 9/2017 | Ogawa | .................. | B60W 10/08 |
| 2002/0136935 A1 | 9/2002 | Iwasaki | | |

(Continued)

FOREIGN PATENT DOCUMENTS

| | | |
|---|---|---|
| CN | 1388782 A | 1/2003 |
| JP | 2005-160269 | 6/2005 |

(Continued)

*Primary Examiner* — Kawing Chan
(74) *Attorney, Agent, or Firm* — Finnegan, Henderson, Farabow, Garrett & Dunner, LLP

(57) ABSTRACT

A vehicle driven by a motor includes: a secondary battery configured to supply an electric power to the motor; a power regeneration portion configured to supply, to the secondary battery, a regenerative electric power that is recovered at a time of braking the vehicle; a power storage amount detecting portion configured to detect a power storage amount of the secondary battery; and a controlling portion configured to control charging and discharging of the secondary battery. The controlling portion estimates a regenerative electric power, and estimates an expected power-storage increasing amount, so as to calculate a virtual power storage amount from a sum total of the expected power-storage increasing amount and an actual power storage amount. The controlling portion performs charging and discharging on the secondary battery based on the virtual power storage amount.

10 Claims, 6 Drawing Sheets

(56) References Cited

U.S. PATENT DOCUMENTS

| | | | |
|---|---|---|---|
| 2010/0006359 A1* | 1/2010 | Ang | B60K 6/445 |
| | | | 180/65.285 |
| 2010/0301867 A1* | 12/2010 | Munukur | H01M 10/443 |
| | | | 324/427 |
| 2011/0018491 A1 | 1/2011 | Yoshida et al. | |
| 2011/0293972 A1 | 12/2011 | Naganuma et al. | |
| 2012/0032637 A1* | 2/2012 | Kotooka | B60K 6/46 |
| | | | 320/109 |
| 2013/0015860 A1 | 1/2013 | Crombez | |
| 2013/0300337 A1* | 11/2013 | Nagaoka | G05B 19/416 |
| | | | 318/671 |
| 2014/0172211 A1* | 6/2014 | Kim | B60L 15/2009 |
| | | | 701/22 |
| 2014/0183876 A1* | 7/2014 | Yamashita | E02F 9/2075 |
| | | | 290/36 R |
| 2014/0200763 A1* | 7/2014 | Sisk | B60W 10/24 |
| | | | 701/36 |
| 2015/0336458 A1* | 11/2015 | Lee | B60L 15/2009 |
| | | | 701/70 |

FOREIGN PATENT DOCUMENTS

| | | |
|---|---|---|
| JP | 2006-248431 A | 9/2006 |
| JP | 2009-230995 A | 10/2009 |
| JP | 2012-070554 A | 4/2012 |
| JP | 2013-099994 A | 5/2013 |
| JP | 2013-109859 A | 6/2013 |
| JP | 2014-150704 | 8/2014 |
| KR | 10-2012-0006969 | 1/2012 |

\* cited by examiner

VEHICLE DRIVEN BY MOTOR AND CONTROL METHOD OF CHARGING AND DISCHARGING OF SECONDARY BATTERY PROVIDED IN VEHICLE

INCORPORATION BY REFERENCE

The disclosure of Japanese Patent Application No. 2014-225678 filed on Nov. 6, 2014 including the specification, drawings and abstract is incorporated herein by reference in its entirety.

BACKGROUND OF THE INVENTION

1. Field of the Invention

The invention relates to a vehicle driven by a motor and a control method of charging and discharging of a secondary battery provided in the vehicle.

2. Description of Related Art

Conventionally, there has been known such a technique that, in a vehicle provided with a secondary battery for supplying an electric power to a motor, charging and discharging of the secondary battery is controlled so that a power storage amount (SOC: State of Charge) of the secondary battery is kept between a predetermined upper limit and a predetermined lower limit. The vehicle is, for example, a fuel cell vehicle, a hybrid vehicle, or the like. In terms of this technique, in order to more effectively obtain a regenerative energy at the time of braking the vehicle, there has been known a drive control device which specifies a descent zone having a predetermined height difference and existing on a running path of a vehicle and which expands a management width between the upper limit and the lower limit at the time when the vehicle runs in the zone thus specified (Japanese Patent Application Publication No. 2005-160269 (JP 2005-160269 A)).

However, there is room for further improvement as for the technique to control charging and discharging of the secondary battery. For example, in a case where the management width of the power storage amount (SOC) of the secondary battery is changed like JP 2005-160269 A, it is necessary to change settings of those other parts of the drive control device which are affected by the management width, along with the change of the management width, thereby causing such a problem that the control is complicated. Further, for example, in JP 2005-160269 A, a regenerative energy obtained when a current kinetic energy of the vehicle is regenerated is not considered sufficiently.

SUMMARY OF THE INVENTION

The invention can be realized in the following aspects.

(1) According to one aspect of the invention, a vehicle driven by a motor is provided. The vehicle includes: a secondary battery configured to supply an electric power to the motor; a power regeneration portion configured to supply, to the secondary battery, a regenerative electric power that is recovered at a time of braking the vehicle; a power storage amount detecting portion configured to detect a power storage amount of the secondary battery; and a controlling portion configured to control charging and discharging of the secondary battery, and the controlling portion is configured to estimate a regenerative electric power that the vehicle obtains, and estimates an expected power-storage increasing amount corresponding to an increasing amount of the power storage amount at a time when the regenerative electric power thus estimated is supplied to the secondary battery, so as to calculate a virtual power storage amount from a sum total of the expected power-storage increasing amount thus estimated and an actual power storage amount detected by the power storage amount detecting portion, and the controlling portion performs charging and discharging on the secondary battery based on the virtual power storage amount. According to this configuration, a charging and discharging control on the secondary battery can be performed in consideration of the expected power-storage increasing amount of the secondary battery at a time when a kinetic energy of the vehicle is regenerated. For example, in a case where an increase in the power storage amount of the secondary battery due to a regenerative electric power can be expected, charging can be restrained as compared with a case where the increase is not expected. This makes it possible to reduce a disposal amount of the regenerative electric power due to saturation of the secondary battery at a time of subsequently recovering the regenerative electric power, thereby making it possible to improve recovery efficiency of the kinetic energy. Further, in a case where an increase in the power storage amount of the secondary battery due to the regenerative electric power can be expected, it is possible to more actively discharge the secondary battery as compared with a case where the increase is not expected. Hereby, in a case where this configuration is applied to a fuel cell vehicle or a hybrid vehicle, when an electric power supply amount from the secondary battery to the motor is increased, it is possible to restrain a power generation amount by the fuel cell or an engine, and to achieve improvement of fuel efficiency. Further, according to this configuration, since it is not necessary to change a management width between the upper limit and the lower limit of the power storage amount, a control is performed more easily than a case where the management width is changed. Further, since the management width between the upper limit and the lower limit of the power storage amount is not changed, an existing map can be used as a control map for charging and discharging itself.

(2) In the vehicle of the aforementioned aspect, the controlling portion may be configured to determine whether or not the expected power-storage increasing amount thus estimated is larger than a predetermined upper limit of the expected power-storage increasing amount, and when the expected power-storage increasing amount thus estimated is larger than the upper limit of the expected power-storage increasing amount, the controlling portion may be configured to calculate the virtual power storage amount from a sum total of the upper limit of the expected power-storage increasing amount and the actual power storage amount. According to this configuration, it is possible to restrain an excessive SOC decrease and deterioration of the secondary battery due to a deviation between the expected power-storage increasing amount thus estimated and an actually obtained increasing amount of the power storage amount due to a recovery energy.

(3) The vehicle of the aforementioned aspect may further include a power generation portion that is able to supply an electric power to the motor and the secondary battery, and the controlling portion may be configured to perform charging on the secondary battery by use of the power generation portion, and to perform a control on respective electric powers to be supplied to the motor from the secondary battery and the power generation portion. According to this configuration, it is possible to easily perform charging and discharging on the secondary battery.

(4) The vehicle of the aforementioned aspect may further include a velocity detecting portion configured to detect a velocity of the vehicle, and the controlling portion may be configured to estimate, as the regenerative electric power that the vehicle obtains, an electric power obtained at the time when that kinetic energy of the vehicle which corresponds to the velocity is regenerated by the power regeneration portion, by use of that velocity of the vehicle which is detected by the velocity detecting portion, and the controlling portion may be configured to perform charging and discharging on the secondary battery so that the virtual power storage amount is between a predetermined upper limit and a predetermined lower limit of the virtual power storage amount. According to this configuration, it is possible to estimate, from the vehicle velocity, the expected power-storage increasing amount of the secondary battery at the time when a kinetic energy of the vehicle is regenerated. Further, it is possible to easily perform a charging and discharging control on the secondary battery based on the virtual power storage amount.

(5) Another aspect of the invention provides a control method of charging and discharging of a secondary battery provided in a vehicle. The control method is configured to perform: detecting a power storage amount in the secondary battery; estimating a regenerative electric power that the vehicle obtains; estimating an expected power-storage increasing amount corresponding to an increasing amount of the power storage amount at a time when the regenerative electric power thus estimated is supplied to the secondary battery; calculating a virtual power storage amount from a sum total of a detected actual power storage amount and the expected power-storage increasing amount thus estimated; and performing charging and discharging on the secondary battery based on the virtual power storage amount. According to this configuration, a charging and discharging control on the secondary battery can be performed in consideration of the expected power-storage increasing amount of the secondary battery at a time when the kinetic energy of the vehicle is regenerated, thereby making it possible to improve recovery efficiency of the kinetic energy. Further, in a case where this configuration is applied to a fuel cell vehicle or a hybrid vehicle, it is possible to achieve improvement of fuel efficiency. Further, according to this configuration, a control is performed more easily than a case where the management width of the power storage amount is changed, and an existing map can be used as a control map for charging and discharging itself.

Note that the invention can be realized in various aspects. For example, the invention can be realized in the form of a control device of a secondary battery to be provided in vehicles such as a fuel cell vehicle, a hybrid vehicle, and an electric vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A. First Embodiment

Figure 1:
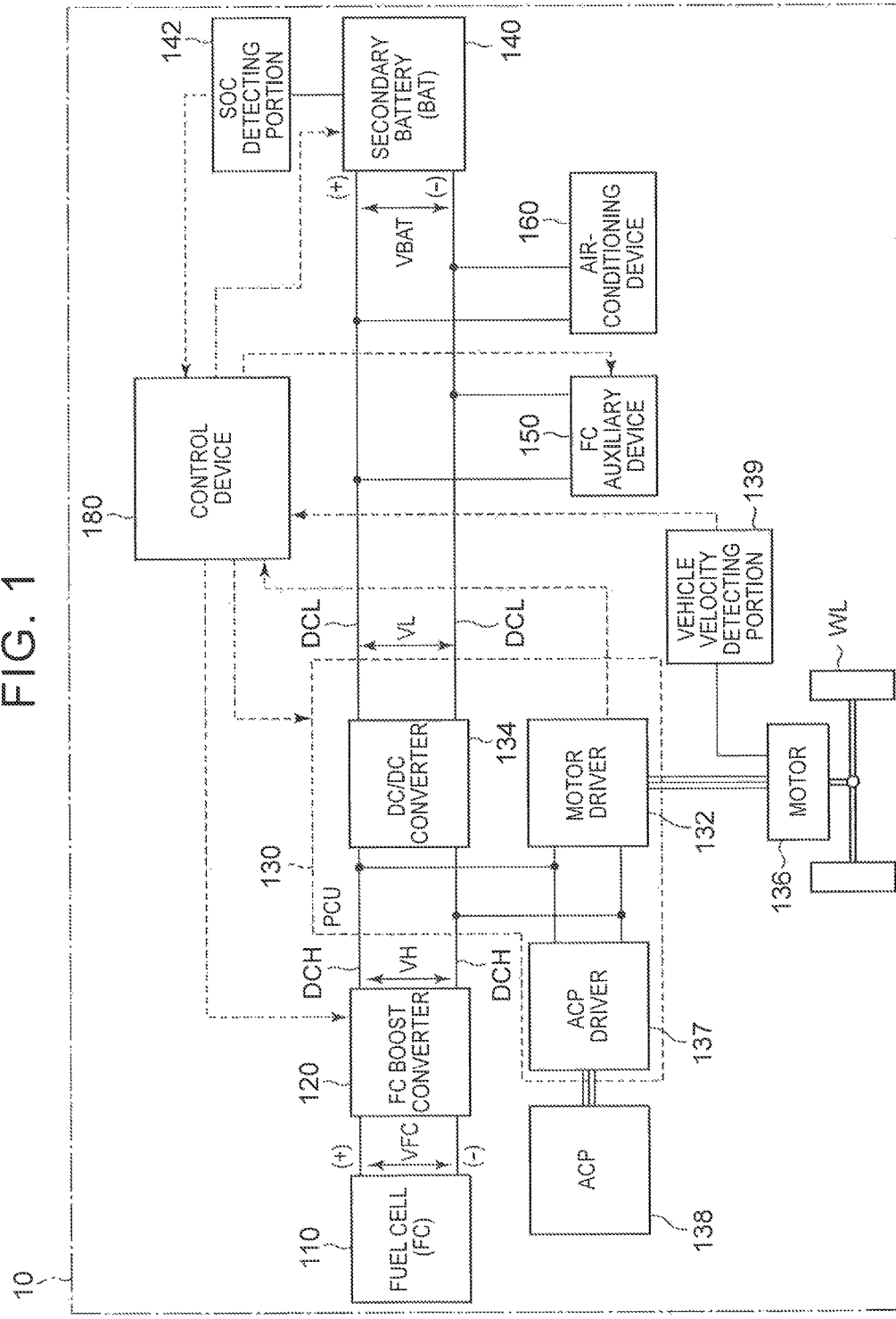
FIG. 1 is a schematic view illustrating a configuration of a fuel cell vehicle according to a first embodiment.

FIG. 1 is a schematic view illustrating a configuration of a fuel cell vehicle 10 in the first embodiment. The fuel cell vehicle 10 includes a fuel cell 110, an FC boost converter 120, a power control unit (PCU) 130, a motor 136, an air compressor (ACP) 138, a vehicle velocity detecting portion 139, a secondary battery 140, an SOC detecting portion 142, an FC auxiliary device 150, an air-conditioning device 160, a control device 180, and a vehicle wheel WL. The fuel cell vehicle 10 runs by driving the motor 136 by electric powers supplied from the fuel cell 110 and the secondary battery 140.

The fuel cell 110 is a solid polymer fuel cell configured to generate an electric power upon receipt of hydrogen and oxygen as reactant gases. Note that the fuel cell 110 is not limited to the solid polymer fuel cell, and various types of fuel cells can be employed as the fuel cell 110. The fuel cell 110 is connected to high-voltage direct current wiring lines DCH via the FC boost converter 120, and is connected to a motor driver 132 included in the PCU 130 via the high-voltage direct current wiring lines DCH. The FC boost converter 120 boosts an output voltage VFC of the fuel cell 110 to a high voltage VH that is usable in the motor driver 132.

The motor driver 132 is constituted by a three-phase inverter circuit, and is connected to the motor 136. The motor driver 132 converts, into three-phase alternating-current powers, an output electric power supplied from the fuel cell 110 via the FC boost converter 120 and an output electric power supplied from the secondary battery 140 via a DC/DC converter 134, and supplies them to the motor 136. The motor 136 is constituted by a synchronous motor including a three-phase coil, and drives the vehicle wheel WL via gears or the like. Further, the motor 136 functions as a generator for generating a regenerative electric power by regenerating a kinetic energy of the fuel cell vehicle 10, at the time of braking the fuel cell vehicle 10. The vehicle velocity detecting portion 139 detects a vehicle velocity Vve of the fuel cell vehicle 10, and transmits it to the control device 180.

The DC/DC converter 134 adjusts a voltage level of the high-voltage direct current wiring lines DCH according to a driving signal from the control device 180, and switches between charging/discharging states of the secondary battery 140. Note that, in a case where a regenerative electric power is generated in the motor 136, the regenerative electric power is converted into a direct-current power by the motor driver 132, and charged to the secondary battery 140 via the DC/DC converter 134.

An ACP driver 137 is constituted by a three-phase inverter circuit, and is connected to the ACP 138. The ACP driver 137 converts, into three-phase alternating-current powers, an output electric power supplied from the fuel cell 110 via the FC boost converter 120 and an output electric power supplied from the secondary battery 140 via the DC/DC converter 134, and supplies them to the ACP 138. The ACP 138 is constituted by a synchronous motor including a three-phase coil and drives the motor according to an electric power supplied thereto, so as to supply, to the fuel cell 110, oxygen (air) used for power generation.

The secondary battery 140 is a power storage device that can store electric power energy and performs charge and discharge repeatedly, and can be constituted by a lithium ion battery, for example. Note that the secondary battery 140 may be other types of batteries such as a lead battery, a nickel cadmium battery, and a nickel metal hydride battery. The secondary battery 140 is connected to the DC/DC converter 134 included in the PCU 130 via low-voltage direct current wiring lines and is further connected to the high-voltage direct current wiring lines DCH via the DC/DC converter 134.

The SOC detecting portion 142 detects a power storage amount (SOC) of the secondary battery 140, and transmits it to the control device 180. Note that the "power storage amount (SOC)" in the present specification indicates a ratio of a remaining charge amount to a current charge capacity of the secondary battery 140. Hereinafter, that power storage amount (SOC) of the secondary battery 140 which is detected by the SOC detecting portion 142 is also referred to as a "power storage amount Rsoc." The SOC detecting portion 142 detects a temperature Tba, an output voltage, and an output current of the secondary battery 140, and detects a power storage amount Rsoc based on those detected values. Note that the SOC detecting portion 142 of the present embodiment also transmits the temperature Tba of the secondary battery 140 to the control device 180.

The FC auxiliary device 150 and the air-conditioning device 160 are each connected to the low-voltage direct current wiring lines DCL, and are driven by electric powers supplied from the fuel cell 110 and the secondary battery 140. The FC auxiliary device 150 is an auxiliary device for power generation of the fuel cell 110, such as a fuel pump for supplying reactant gas to the fuel cell 110 and a refrigerant pump for supplying refrigerant to the fuel cell 110. The air-conditioning device 160 is an air conditioning unit such as an air conditioner.

The control device 180 is constituted by a microcomputer including a central processing unit and a main storage. When the control device 180 detects an operation such as an accelerator operation by a driver, the control device 180 controls power generation of the fuel cell 110 and charging and discharging of the secondary battery 140 according to a content of the operation. The control device 180 generates driving signals corresponding to an accelerator opening degree, and transmits them to the motor driver 132 and the DC/DC converter 134, respectively. The motor driver 132 rotationally drives the motor 136 according to the accelerator opening degree by adjusting a pulse width of an alternating voltage in response to the driving signal from the control device 180. The control device 180 includes a secondary battery assist control map indicative of a relationship between a secondary battery assist rate and a power storage amount (SOC) of the secondary battery 140, and a map indicative of a relationship between an HV requested electric power and a secondary battery output and also indicative of a power distribution that minimizes system loss. With respect to a necessary electric power (a requested electric power) to rotationally drive the motor 136 according to the accelerator opening degree, the control device 180 determines an output of the secondary battery from a product of a secondary battery assist rate calculated from the secondary battery assist control map and an a secondary battery output calculated from the map (an HV-requested-electric-power and secondary-battery-output map) indicative of the relationship between an HV requested electric power and a secondary battery output. A configuration of the secondary battery assist control map will be described later.

The control device 180 acquires a power storage amount Rsoc detected by the SOC detecting portion 142, and controls charging and discharging of the secondary battery 140 so that a power storage amount of the secondary battery 140 falls within a predetermined range based on the power storage amount Rsoc thus acquired. A charging and discharging control of the secondary battery 140 by the control device 180 based on a detected value of the SOC is called an "SOC correction control." When an SOC feedback control is started, the control device 180 sets, in advance, an upper limit and a lower limit as a reference to prescribe an allowable range of the power storage amount of the secondary battery 140. The control device 180 includes an SOC correction control map indicative of a relationship between a power storage amount (SOC) of the secondary battery 140 and a charge/discharge amount necessary for the power storage amount of the secondary battery 140 to fall within a predetermined range, and determines a charge/discharge amount of the secondary battery 140 by use of the map. A configuration of the SOC correction control map will be described later.

Figure 2:
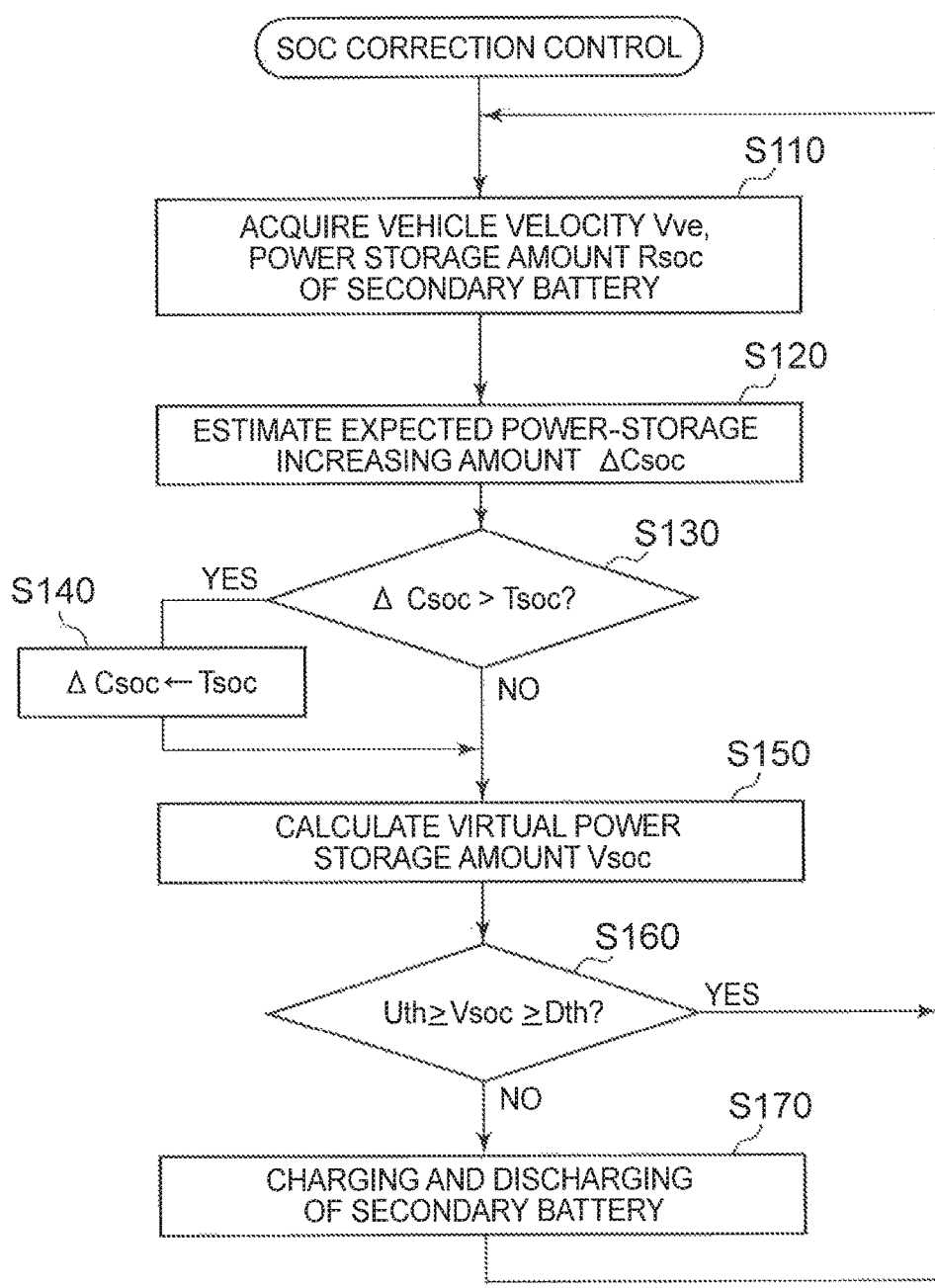
FIG. 2 is a flowchart to describe an SOC correction control by a control device.

FIG. 2 is a flowchart to describe an SOC correction control by the control device 180. When the control device 180 detects a specific operation such as ignition ON by a driver, the control device 180 starts an SOC correction control. Initially, the control device 180 acquires a vehicle velocity Vve from the vehicle velocity detecting portion 139, and acquires a power storage amount Rsoc of the secondary battery 140 from the SOC detecting portion 142 (step S110). At this time, the control device 180 of the present embodiment also acquires a temperature Tba of the secondary battery 140 from the SOC detecting portion 142.

After having acquired at least the vehicle velocity Vve, the control device 180 estimates an expected power-storage increasing amount ΔCsoc (step S120). The expected power-storage increasing amount ΔCsoc corresponds to an increasing amount of the power storage amount Rsoc at the time when a regenerative electric power obtained by braking the fuel cell vehicle 10 at the vehicle velocity Vve detected by the vehicle velocity detecting portion 139 is supplied to the secondary battery 140. In other words, the expected power-storage increasing amount ΔCsoc is an expected increasing amount of the power storage amount Rsoc at the time when that kinetic energy of the fuel cell vehicle 10 which corresponds to the vehicle velocity Vve is regenerated by the motor 136. Thus, the control device 180 also has a function as a regeneration amount estimation portion for estimating a regenerative electric power to be provided to the fuel cell vehicle 10. Note that, when a downslope continues from now on based on navigation information, for example, the control device 180 as the regeneration amount estimation portion may estimate, from the information, a regenerative electric power to be provided to the fuel cell vehicle 10.

In the present embodiment, the expected power-storage increasing amount ΔCsoc is calculated by use of a detected vehicle velocity Vve according to Formula (1) as follows:

$$\Delta Csoc = 0.5 \cdot Wve \cdot (Vve)^2 \cdot Erc \cdot Etr \cdot Ech \cdot Uco \cdot Win \quad (1)$$

Here, Wve indicates a weight of the fuel cell vehicle 10. Erc·Etr·Ech indicates energy efficiency until a kinetic energy of the fuel cell vehicle 10 is turned into an electric energy (a regenerative energy) to be stored in the secondary battery 140, and is set as a given value. Erc indicates efficiency (regeneration recovery efficiency) at the time when a kinetic energy is converted into a regenerative energy in the motor 136. Etr indicates efficiency at the time when a regenerative electric power generated by the motor 136 passes through the motor driver 132 and the DC/DC converter 134. Ech indicates efficiency (charging efficiency) at the time when the secondary battery 140 is charged with the regenerative electric power. Uco is a coefficient (a unit conversion coefficient) for converting a regenerative energy stored in the secondary battery 140 into a power storage amount (SOC) of the secondary battery 140. Win indicates a charge limitation rate to deal with that charge ability of the secondary battery 140 that changes depending on the temperature Tba of the secondary battery 140, and is calculated uniquely from the temperature Tba detected by the SOC detecting portion 142. Since the calculation formula for ΔCsoc includes Win, when the charge ability of the secondary battery 140 is limited, the expected power-storage increasing amount ΔCsoc can be reduced.

After having estimated the expected power-storage increasing amount ΔCsoc, the control device 180 determines whether or not the expected power-storage increasing amount ΔCsoc is larger than an upper limit Tsoc set as a guard value (step S130). The upper limit Tsoc is a value to restrain an excessive SOC decrease and deterioration of the secondary battery 140 due to a deviation between the expected power-storage increasing amount ΔCsoc and that actual increasing amount of the power storage amount Rsoc which is obtained by subsequent braking. When the expected power-storage increasing amount ΔCsoc thus estimated is larger than the upper limit Tsoc, the control device 180 sets the upper limit Tsoc as the power-storage increasing amount ΔCsoc (step S140). Hereby, even if a regenerative energy actually obtained at the time of braking the vehicle is largely smaller than an expected amount, the power storage amount Rsoc is hard to become less than an allowable lower limit of the power storage amount. Hereby, the secondary battery 140 can be protected.

After having estimated the expected power-storage increasing amount ΔCsoc, the control device 180 calculates a virtual power storage amount Vsoc with the use of the expected power-storage increasing amount ΔCsoc and the power storage amount Rsoc (step S150). The virtual power storage amount Vsoc is a virtual power storage amount of the secondary battery 140 obtained such that that kinetic energy of the fuel cell vehicle 10 which is expected to be recovered as a regenerative energy in the future is estimated in terms of an actual power storage amount Rsoc of the secondary battery 140. The virtual power storage amount Vsoc is calculated according to Formula (2) as follows:

$$Vsoc = Rsoc + \Delta Csoc \quad (2)$$

The control device 180 determines whether or not charging and discharging is performed on the secondary battery 140 by applying the calculated virtual power storage amount Vsoc to the SOC correction control map, and also determines a charge/discharge amount in a case where charging and discharging is performed. More specifically, the control device 180 initially determines whether or not the virtual power storage amount Vsoc satisfies Formula (3) as follows, that is, determines whether or not the virtual power storage amount Vsoc is between an upper limit Uth and a lower limit Dth of the power storage amount (step S160).

$$Uth \geq Vsoc \geq Dth \quad (3)$$

When the virtual power storage amount Vsoc is between the upper limit Uth and the lower limit Dth, the virtual power storage amount Vsoc is near a target power storage amount, so the control device 180 does not perform charging and discharging for adjusting the power storage amount of the secondary battery 140. The control device 180 then performs a process of step S110 again. In the meantime, when the virtual power storage amount Vsoc is not between the upper limit Uth and the lower limit Dth, the control device 180 performs charging and discharging on the secondary battery 140, so that the virtual power storage amount Vsoc approaches the target power storage amount (step S170). A charge/discharge amount of the secondary battery 140 is determined based on the virtual power storage amount Vsoc and the SOC correction control map. After that, the control device 180 performs the process of step S110 again. Thus, the control device 180 performs each process in FIG. 2 repeatedly, thereby performing charging and discharging on the secondary battery 140 so that the virtual power storage amount Vsoc is kept between the upper limit Uth and the lower limit Dth.

Figure 3:
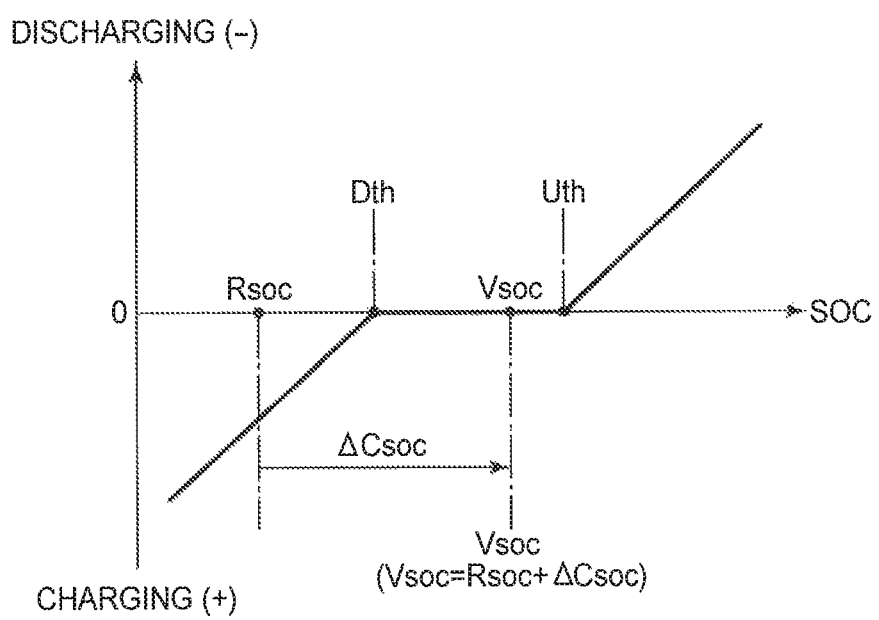
FIG. 3 is a view to describe an SOC correction control map.

FIG. 3 is a view to describe the SOC correction control map. The SOC correction control map indicates a relationship between a power storage amount (SOC) of the secondary battery 140 and a charge/discharge amount of the secondary battery 140 for SOC, correction. A horizontal axis in FIG. 3 indicates the power storage amount (SOC) of the secondary battery 140 and a vertical axis indicates the charge/discharge amount of the secondary battery 140. Further, FIG. 3 exemplifies an actual power storage amount Rsoc of the secondary battery 140 and a calculated virtual power storage amount Vsoc.

The control device 180 controls charging and discharging of the secondary battery 140 based on a position of the virtual power storage amount Vsoc in the SOC correction control map. In FIG. 3, the virtual power storage amount Vsoc is between the upper limit Uth and the lower limit Dth, so the control device 180 does not perform charging and discharging on the secondary battery 140. In the meantime, in a case where a control of charging and discharging of the secondary battery 140 is performed based on the actual power storage amount Rsoc like a conventional technique, the power storage amount Rsoc is smaller than the lower limit Dth, so charging to the secondary battery 140 is performed. Thus, in a case where an increase in the power storage amount of the secondary battery 140 by a regenerative electric power can be expected by performing the control based on the virtual power storage amount Vsoc, charging to the secondary battery 140 can be restrained as compared with a case where the increase cannot be expected. This makes it possible to restrain unnecessary power generation of the fuel cell 110 and improve fuel efficiency. Further, this makes it possible to reduce such cases where the SOC rises due to the unnecessary power generation at the time of subsequently supplying a regenerative electric power, and the SOC leans toward a discharging side (a right side in FIG. 3) so that an output is not supplied from the secondary battery according to efficient power distribution, thereby decreasing fuel efficiency. Further, in a case where an increase in the power storage amount of the secondary battery by a regenerative electric power can be expected, it is possible to more actively discharge the secondary battery 140. Hereby, by increasing an electric power supply amount from the secondary battery 140 to the motor 136, it is possible to restrain a power generation amount by the fuel cell 110, and to achieve improvement of fuel efficiency of the fuel cell vehicle 10.

Figure 4:
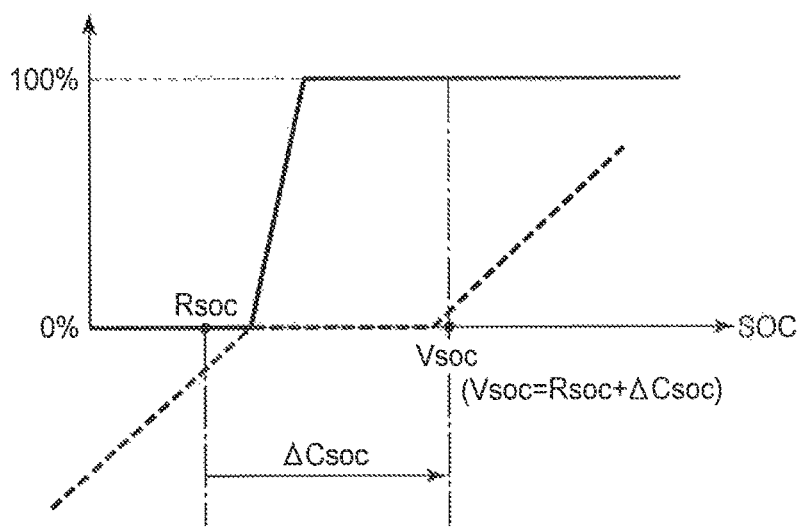
FIG. 4 is a view to describe a secondary battery assist control map.

FIG. 4 is a view to describe the secondary battery assist control map. The secondary battery assist control map indicates a relationship between a power storage amount (SOC) of the secondary battery 140 and a secondary battery assist rate. An output of the secondary battery 140 is determined by a product of a secondary battery assist rate and a secondary battery output calculated from an HV-requested-electric-power and secondary-battery-output map. For example, when the secondary battery assist rate is 0%, it is meant that an electric power is supplied to the motor 136 only from the fuel cell 110. A horizontal axis of FIG. 4 indicates the power storage amount (SOC) of the secondary battery 140, and a vertical axis indicates the secondary battery assist rate. Further, FIG. 4 exemplifies an actual power storage amount Rsoc of the secondary battery 140 and a calculated virtual power storage amount Vsoc, also exemplifies an SOC correction control map by a broken line.

The control device 180 determines the secondary battery assist rate based on a position of the virtual power storage amount Vsoc in the secondary battery assist control map. That is, in FIG. 4, the secondary battery assist rate is 100% from a position of the virtual power storage amount Vsoc. That is, an electric power is supplied to the motor 136 only from the secondary battery 140, and no electric power is supplied to the motor 136 from the fuel cell 110. In the meantime, in a case where the secondary battery assist rate is determined based on the actual power storage amount Rsoc like a conventional technique, the secondary battery assist rate is 0% in FIG. 4. That is, a secondary battery output calculated from the HV-requested-electric-power and secondary-battery-output map is taken as an output of the secondary battery 140. Thus, in a case where an assist rate is determined based on the virtual power storage amount Vsoc, when an increase in the power storage amount of the secondary battery 140 due to a regenerative electric power can be expected, the secondary battery assist rate can be raised as compared with a case where the increase cannot be expected. Hereby, a burden ratio of the electric power to the motor 136 from the fuel cell 110 can be reduced, thereby making it possible to achieve improvement of fuel efficiency.

Figure 5:
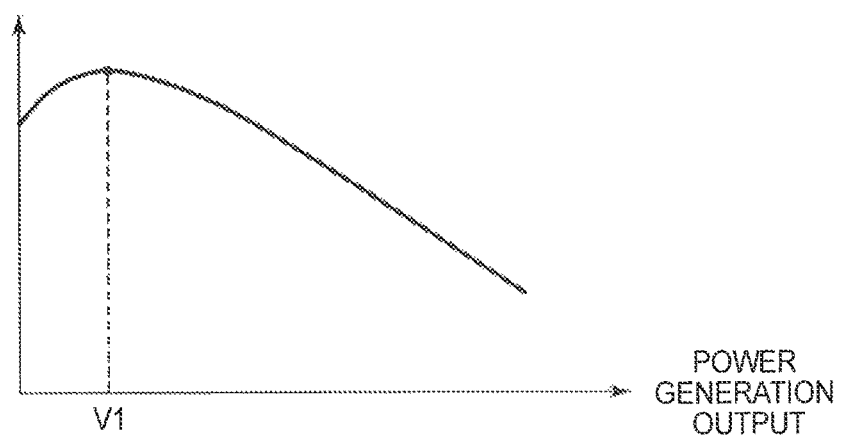
FIG. 5 is an explanatory view that exemplifies a relationship between power generation efficiency and output voltage in a fuel cell.

FIG. 5 is an explanatory view that exemplifies a relationship between power generation efficiency and output voltage in the fuel cell 110. The power generation efficiency of the fuel cell 110 is highest at the time of an output voltage V1 with a relatively low load, and as the load increases from that point, the power generation efficiency decreases. By increasing the assist rate of the secondary battery 140 with respect to a requested electric power of the motor 136, the load of the fuel cell 110 is reduced, thereby allowing the fuel cell 110 to be operated with high efficiency. This makes it possible to achieve improvement of fuel efficiency of the fuel cell 110.

According to the fuel cell vehicle 10 of the present embodiment described above, a charging and discharging control on the secondary battery 140 can be performed in consideration of the expected power-storage increasing amount ΔCsoc of the secondary battery 140 at the time when a kinetic energy of the fuel cell vehicle 10 is regenerated, thereby making it possible to improve recovery efficiency of the kinetic energy. For example, as can be seen from FIG. 3, in a case where an increase in the power storage amount of the secondary battery 140 due to a regenerative electric power can be expected (expected power-storage increasing amount ΔCsoc>>0), charging by power generation of the fuel cell 110 is restrained as compared with a case where the increase cannot be expected (estimated expected power-storage increasing amount ΔCsoc=0). This makes it possible to restrain hydrogen consumption due to unnecessary power generation, thereby making it possible to reduce a disposal amount of a regenerative electric power due to saturation of the secondary battery 140 at the time of subsequently supplying the regenerative electric power. That is, according to the present embodiment, it is possible to increase a charge/discharge amount with the power storage amount Rsoc of the secondary battery 140 maintained within a predetermined range. Further, a configuration of the present embodiment in which charging and discharging is performed based on the virtual power storage amount Vsoc calculated from the power storage amount Rsoc of the secondary battery 140 is more easily controlled than a configuration in which a management width between the upper limit Uth and the lower limit Dth of the SOC correction control map is changed, so that simplification of the control device can be achieved. Further, in the present embodiment, since the management width between the upper limit Uth and the lower limit Dth is not changed, an existing map can be used as the SOC correction control map itself.

B. Second Embodiment

Figure 6:
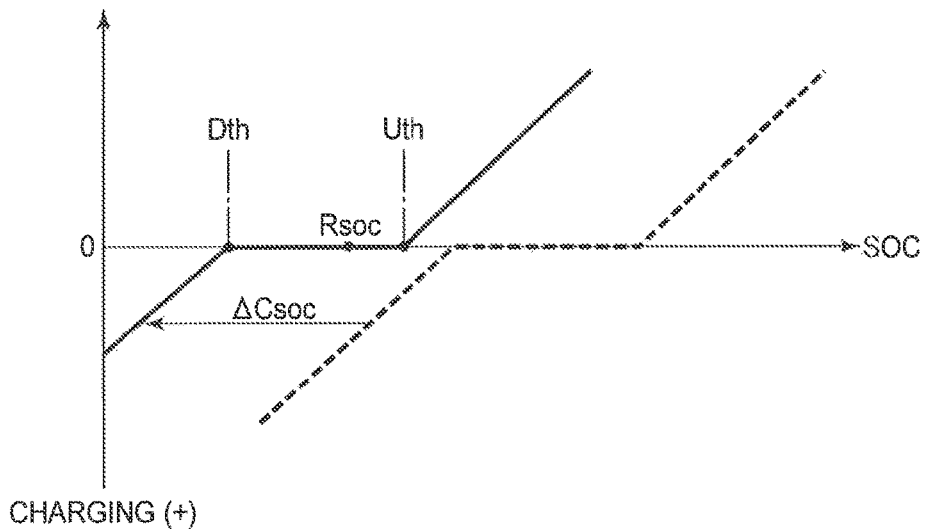
FIG. 6 is a view to describe an SOC correction control map according to a second embodiment.

FIG. 6 is a view to describe an SOC correction control map according to a second embodiment. In the first embodiment, the control device 180 calculates a virtual power storage amount Vsoc from an actual power storage amount Rsoc of the secondary battery 140, and performs a charging and discharging control on the secondary battery 140 by applying the virtual power storage amount Vsoc thus calculated to the SOC correction control map. In a control device 180 of the second embodiment, after having estimated an expected power-storage increasing amount ΔCsoc according to Formula (1), the control device 180 corrects the SOC correction control map according to the expected power-storage increasing amount ΔCsoc thus estimated. More specifically, as illustrated in FIG. 6, the control device 180 shifts, just by the expected power-storage increasing amount ΔCsoc, a relationship between a power storage amount (SOC) of a secondary battery 140 and a charge/discharge amount of the secondary battery 140 for SOC correction in the SOC correction control map (here, the control device 180 moves the relationship toward a left side), so as to newly form an SOC correction control map. The control device 180 performs a charging and discharging control on the secondary battery 140 by applying a detected actual power storage amount Rsoc to the SOC correction control map thus newly formed.

Figure 7:
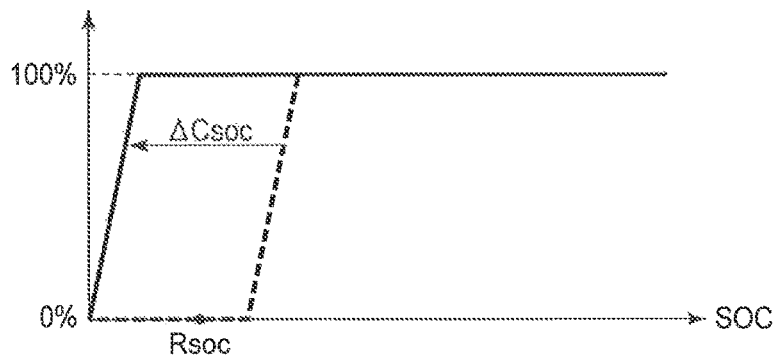
FIG. 7 is a view to describe a secondary battery assist control map according to the second embodiment.

FIG. 7 is a view to describe a secondary battery assist control map according to the second embodiment. Similarly to the SOC correction control map of the second embodiment, the control device 180 corrects the secondary battery assist control map according to an estimated expected power-storage increasing amount ΔCsoc. More specifically, as illustrated in FIG. 7, the control device 180 shifts, just by the expected power-storage increasing amount ΔCsoc, a relationship between a power storage amount (SOC) of the secondary battery 140 and a secondary battery assist rate in the secondary battery assist control map (here, the control device 180 moves the relationship toward a left side), so as to newly form a secondary battery assist control map. The control device 180 determines an assist rate of the secondary battery 140 by applying a detected actual power storage amount. Rsoc to the secondary battery assist control map thus newly formed.

Even in such a configuration, a charging and discharging control on the secondary battery 140 can be performed in consideration of the expected power-storage increasing amount ΔCsoc of the secondary battery 140 at the time when a kinetic energy of the fuel cell vehicle 10 is regenerated, thereby making it possible to improve recovery efficiency of the kinetic energy. This is because, in a case where an increase in the power storage amount of the secondary battery 140 due to a regenerative electric power can be expected, charging by power generation of the fuel cell 110 is restrained. Further, the secondary battery 140 can be more actively discharged, so that it is possible to increase an electric power supply amount to the motor 136 from the secondary battery 140. This makes it possible to restrain a power generation amount of the fuel cell 110 and improve fuel efficiency.

C. Modifications

Note that the invention is not limited to the above embodiments and the above examples, and is performable in various modifications within a range that does not deviate from the gist of the invention. For example, the following modifications can be employed.

C-1. Modification 1

The present embodiment is realized as the fuel cell vehicle 10, but the invention is applicable to a vehicle that does not include a fuel cell. For example, the invention is also applicable to a hybrid vehicle. Even in this case, a charging and discharging control on a secondary battery can be performed in consideration of an expected power-storage increasing amount ΔCsoc of the secondary battery at the time when a kinetic energy of the hybrid vehicle is regenerated, thereby making it possible to improve recovery efficiency of the kinetic energy. Further, the secondary battery can be more actively discharged, so that it is possible to increase an electric power supply amount to a motor from the secondary battery. This makes it possible to restrain a power generation amount of an engine and improve fuel efficiency.

C-2. Modification 2

The fuel cell vehicle 10 includes the vehicle velocity detecting portion 139 that detects a vehicle velocity Vve. However, instead of the vehicle velocity detecting portion 139, the fuel cell vehicle 10 may include a detecting portion for detecting a parameter correlated with the vehicle velocity Vve, such as a rotation number of the motor 136 and an amount of electric power to be supplied to the motor 136. Further, the fuel cell vehicle 10 includes the secondary battery 140. However, instead of the secondary battery 140, the fuel cell vehicle 10 may include a device having a function to electrically store an energy and perform discharging, such as a capacitor, a flywheel, a superconductive coil, and an accumulator. Further, in the fuel cell vehicle 10, the motor 136 for driving the vehicle wheel WL functions as a generator for regenerating a kinetic energy of the fuel cell vehicle 10. However, the fuel cell vehicle 10 may include a generator separately from the motor 136.

C-3. Modification 3

In the present embodiment, the control device 180 calculates, from a vehicle velocity Vve, an expected increasing amount (an expected power-storage increasing amount ΔCsoc) of a power storage amount Rsoc at the time when that kinetic energy of the fuel cell vehicle 10 which corresponds to the vehicle velocity Vve is regenerated by the motor 136. However, the control device 180 may estimate an expected power-storage increasing amount ΔCsoc from other information except the vehicle velocity Vve. For example, when a downslope continues from now on based on navigation information, the control device 180 may estimate an expected power-storage increasing amount ΔCsoc from the information.

C-4. Modification 4

Figure 8:
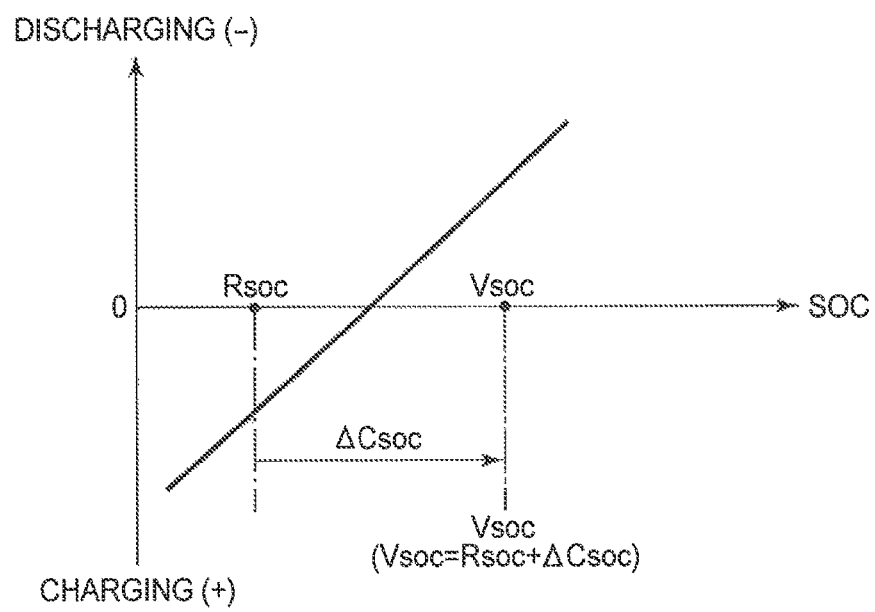
FIG. 8 is a view to describe an SOC correction control map of a modification.

FIG. 8 is a view to describe an SOC correction control map of a modification. The first embodiment is described such that the control device 180 performs a charging and discharging control on the secondary battery 140 so that a virtual power storage amount Vsoc is placed between the upper limit Uth and the lower limit Dth of the power storage amount. However, the upper limit Uth and the lower limit Dth of the power storage amount may not be set in the SOC correction control map. In this case, the control device 180 performs a charging and discharging control on the secondary battery 140 based on a position of the virtual power storage amount Vsoc.

What is claimed is:

1. A vehicle driven by a motor, the vehicle comprising:
a secondary battery configured to supply an electric power to the motor;
a power regeneration portion configured to supply, to the secondary battery, a regenerative electric power that is recovered at a time of braking the vehicle;
a power storage amount detecting portion configured to detect an actual power storage amount of the secondary battery; and
a controlling portion programmed to control charging and discharging of the secondary battery,
wherein the controlling portion is programmed to estimate the regenerative electric power that the vehicle obtains, and estimate an expected power-storage increasing amount corresponding to an increasing amount of the power storage amount at a time when the regenerative electric power thus estimated is supplied to the secondary battery, so as to calculate a virtual power storage amount from a sum total of the expected power storage increasing amount thus estimated and the actual power storage amount detected by the power storage amount detecting portion, and the controlling portion is programmed to perform charging and discharging on the secondary battery based on the virtual power storage amount, and
wherein the controlling portion is programmed to vary an upper limit and a lower limit of the virtual power storage amount such that a width between the upper limit and the lower limit of the virtual power storage amount is not changed.

2. The vehicle according to claim 1, further comprising a power generation portion that is able to supply the electric power to the motor and the secondary battery,
wherein the controlling portion is programmed to perform charging on the secondary battery by use of the power generation portion, and perform a control on respective electric powers to be supplied to the motor from the secondary battery and the power generation portion.

3. The vehicle according to claim 1, wherein the controlling portion is programmed to perform charging and discharging on the secondary battery so that the virtual power storage amount is between the upper limit and the lower limit of the virtual power storage amount.

4. The vehicle according to claim 1, wherein the controlling portion is further programmed to determine whether or not the expected power-storage increasing amount thus estimated is larger than a predetermined upper limit of the expected power-storage increasing amount,
wherein the predetermined upper limit is a value to restrain an excessive state of charge decrease and deterioration of the secondary battery due to a deviation between the expected power-storage increasing amount and the actual increasing amount of the power storage amount which is obtained by subsequent braking of the vehicle, and
wherein when the expected power-storage increasing amount thus estimated is larger than the predetermined upper limit of the expected power-storage increasing amount, the controlling portion is programmed to calculate the virtual power storage amount from a sum total of the predetermined upper limit and the actual power storage amount.

5. The vehicle according to claim 1, the vehicle comprising:
a velocity detecting portion configured to detect velocity of the vehicle;
a temperature detecting portion configured to detect temperature of the secondary battery; and
a controlling portion programmed to control charging and discharging of the secondary battery,
wherein the controlling portion is programmed to:
estimate, using the detected velocity, electric power obtained at the time when kinetic energy of the vehicle which corresponds to the detected velocity is regenerated by the power regeneration portion, as regenerative electric power that the vehicle obtains; and
estimate, using a formula including a charge limitation rate to deal with a charge ability of the secondary battery that changes depending on the detected temperature, the expected power-storage increasing amount corresponding to the increasing amount of the power storage amount at the time when the estimated regenerative electric power is supplied to the secondary battery.

6. The vehicle according to claim 5, wherein the formula is defined as:

$$\Delta C_{SOC} = 0.5 * W_{ve} * (V_{ve})^2 * E_{rc} * E_{tr} * E_{ch} * U_{co} * W_{in},$$

wherein $\Delta C_{SOC}$ is the expected power-storage increasing amount, $W_{ve}$ is a weight of the vehicle, $V_{ve}$ is the detected velocity, $E_{rc}*E_{tr}*E_{ch}$ is an efficiency of converting the kinetic energy into the regenerative electric power, $U_{co}$ is an efficiency of converting the regenerative electric power into a power storage amount of the second battery, and $W_{in}$ is the charge limitation rate to deal with charge ability of the second battery that changes depending on the detected temperature.

7. A control method of charging and discharging of a secondary battery provided in a vehicle, the control method comprising:
detecting an actual power storage amount of the secondary battery;
estimating a regenerative electric power that the vehicle obtains;
estimating an expected power-storage increasing amount corresponding to an increasing amount of the power storage amount at a time when the estimated regenerative electric power is supplied to the secondary battery;
calculating a virtual power storage amount from a sum total of the actual power storage amount thus detected and the expected power-storage increasing amount thus estimated;
performing charging and discharging on the secondary battery based on the virtual power storage amount; and
varying an upper limit and a lower limit of the virtual power storage amount such that a width between the upper limit and the lower limit of the virtual power storage amount is not changed.

8. The control method according to claim 7, the control method further comprising:
determining whether or not the expected power-storage increasing amount thus estimated is larger than a predetermined upper limit of the expected power-storage increasing amount; and
calculating the virtual power storage amount from a sum total of the upper limit of the expected power-storage increasing amount and an actual power storage amount of the second battery, when the expected power-storage increasing amount thus estimated is larger than the predetermined upper limit of the expected power-storage increasing amount, and
wherein the predetermined upper limit of the expected power-storage increasing amount is a value to restrain an excessive state of charge decrease and deterioration of the secondary battery due to a deviation between the expected power-storage increasing amount and the actual increasing amount of the power storage amount which is obtained by subsequent braking of the vehicle.

9. The control method according to claim 7, the control method comprising:
detecting velocity of the vehicle;
estimating, using the detected velocity, electric power obtained at a time when kinetic energy of the vehicle which corresponds to the detected velocity is regenerated, as regenerative electric power that the vehicle obtains;
detecting temperature of the secondary battery; and
estimating, using a formula including a charge limitation rate to deal with a charge ability of the secondary battery that changes depending on the detected temperature, the expected power-storage increasing amount corresponding to the increasing amount of the power storage amount at the time when the estimated regenerative electric power is supplied to the secondary battery.

10. The control method according to claim 9, wherein the formula is defined as:

$$\Delta C_{SOC} = 0.5 * W_{ve} * (V_{ve})^2 * E_{rc} * E_{tr} * E_{ch} * U_{co} * W_{in},$$

wherein $\Delta C_{SOC}$ is the expected power-storage increasing amount, $W_{ve}$ is a weight of the vehicle, $V_{ve}$ is the detected velocity, $E_{rc}*E_{tr}*E_{ch}$ is an efficiency of converting the kinetic energy into the regenerative electric power, $U_{co}$ is an efficiency of converting the regenerative electric power into a power storage amount of the second battery, and $W_{in}$ is the charge limitation rate to deal with charge ability of the second battery that changes depending on the detected temperature.

* * * * *